United States Patent [19]

Fell et al.

[11] 3,951,284
[45] Apr. 20, 1976

[54] DEVICE FOR TRANSPORTING BULK MATERIALS AND METHODS

[75] Inventors: Don Russell Fell, Stoney Creek; Robert Wilson Leonard, Ajax, both of Canada

[73] Assignee: Du Pont of Canada, Ltd., Montreal, Canada

[22] Filed: Apr. 9, 1975

[21] Appl. No.: 566,424

Related U.S. Application Data

[63] Continuation of Ser. No. 387,388, Aug. 10, 1973, abandoned.

[30] Foreign Application Priority Data

Aug. 18, 1972 Canada .................................. 149767

[52] U.S. Cl. ................................. 214/152; 141/10; 214/41 R; 220/1.5; 220/63 R; 296/39 R
[51] Int. Cl.² ......................................... B65D 25/16
[58] Field of Search ............. 214/41, 152; 296/39 R; 105/357, 358, 360, 423; 220/1.5, 63 R, 65; 141/10, 67

[56] References Cited

UNITED STATES PATENTS

| | | | |
|---|---|---|---|
| 2,712,797 | 7/1955 | Woehrle | 296/39 R |
| 3,095,206 | 6/1963 | Fresia et al. | 105/367 X |
| 3,696,952 | 10/1972 | Bodenheimer | 214/314 |
| 3,731,828 | 5/1973 | Clarke et al. | 214/49 |

Primary Examiner—Robert G. Sheridan

[57] ABSTRACT

A device is disclosed for transporting bulk materials in a shipping vehicle having walls one of which defines a door opening and doors attached thereto. The device includes a flexible liner having sides adjacent the walls of the vehicle, and stretchable connectors supporting the liner from the tops of the walls or if the vehicle has a roof from the roof of the vehicle. The side of the liner adjacent the door opening has at least two apertures in the upper portion, one being an entry opening and one a vent opening, and at least one aperture in the lower portion being a discharge opening.

23 Claims, 6 Drawing Figures

DEVICE FOR TRANSPORTING BULK MATERIALS AND METHODS

This is a continuation of application Ser. No. 387,388, filed Aug. 10, 1973, now abandoned.

This invention relates to the shipment of bulk material in shipping vehicles and more particularly to a flexible liner suitable for installation in a standard international container together with a method of transporting bulk material in a closed shipping vehicle having a flexible liner. The term "bulk material" includes, but is not limited to substances in the form of powder, pellets, flakes or granules, and also includes liquids. Examples of bulk material include synthetic resins, salts, grains, etc.

A large part of the goods and materials moved today are transported and stored in containers. Many of these containers are of a standard size to meet international specifications so that they may be used on land based vehicles, ships and barges and may also be stacked aboard large sea going vessels. For economic reasons it has been found desirable to ship bulk materials in containers and in order to do this a flexible liner has been used in a standard container. Other methods have been tried using special containers especially adapted for bulk materials, however in many cases this has proved unsatisfactory as the special containers cannot be used for a return load due to a contamination from the initial load or the special containers were unsuitable for the return load.

A number of problems arise with the liners presently available for the transportation of bulk materials in containers. Initially hooks or eyelets were generally provided in a liner to provide a means of support for the liner from the inside walls or ceiling of a container. However it was found that when the container was full, the weight of the bulk material plus the vibration from the movement of the container in transit would cause the liner to tear, either making holes in the liner or alternatively tearing out a hook or eyelet. Other methods include attaching the liner to bulkheads at either one or both end walls of the container so that the liner is supported at both end walls of the container. This system is found to be suitable for some small containers, but generally requires air to be blown into the liner during unloading as well as loading, otherwise the liner may collapse and plug up the liner outlet. Furthermore, this type of liner can only be used once, and then must be thrown out or extensively repaired. Other examples of the installation of liners in containers is by adhesive means, wherein the sides of the liner are attached to the container. However this has also proven unsatisfactory as the liner is generally torn when being removed from the container and thus cannot be reused.

Another problem that occurs with existing liners is concerned with the installation of a liner in a container. Considerable time is required to install a liner, normally utilizing more than one person and sometimes requiring special equipment. Furthermore, special equipment is required to unload the full container which is inconvenient when the container arrives at a remote destination.

It is an object of the present invention to provide a liner suitable for installation in a shipping vehicle to enable the vehicle to be used for the shipment of bulk material. It is a further object of the present invention to provide a liner which may be installed in a standard container by one man in a short period of time and may be removed and reused time and again. A further object of the present invention is to provide a liner for a shipping vehicle which does not collapse when being loaded or unloaded with bulk material. A still further object of the present invention is to provide a method of transporting bulk material in a closed shipping vehicle which does not require special equipment for unloading the bulk material at its destination.

With these and other objects in view there is provided a device for transporting bulk material in a shipping vehicle having walls, one of which defines a door opening and doors attached thereto, the device comprising a flexible liner having sides adjacent the walls of the shipping vehicle supported by a plurality of stretchable connectors between the tops of the shipping vehicle walls and the liner, the side of the liner adjacent the shipping vehicle door opening having at least two apertures in the upper portion of the liner thereof, and at least one aperture in the lower portion of the liner thereof, the apertures in the upper portion of the liner representing an entry opening and a vent opening and the aperture in the lower portion of the liner representing a discharge opening, each of the apertures having a closing means.

Furthermore, there is provided in a method of transporting bulk material in a shipping vehicle having walls, one of which defines a door opening and doors attached thereto, including the steps of installing a flexible liner inside the vehicle, the flexible liner having sides to rest adjacent the walls and having a loading sleeve, vent sleeve and at least one unloading sleeve in the side of the liner adjacent the door opening, loading the bulk material into the flexible liner by pneumatic loading means and subsequently unloading the bulk material by gravity, the improvement comprising the steps of flexibly suspending the flexible liner from the top of the walls of the vehicle, installing a separate bulkhead in the door opening of the vehicle, the bulkhead having at least one removable panel for the unloading sleeve.

In drawings which illustrate embodiments of the invention.

Figure 1:
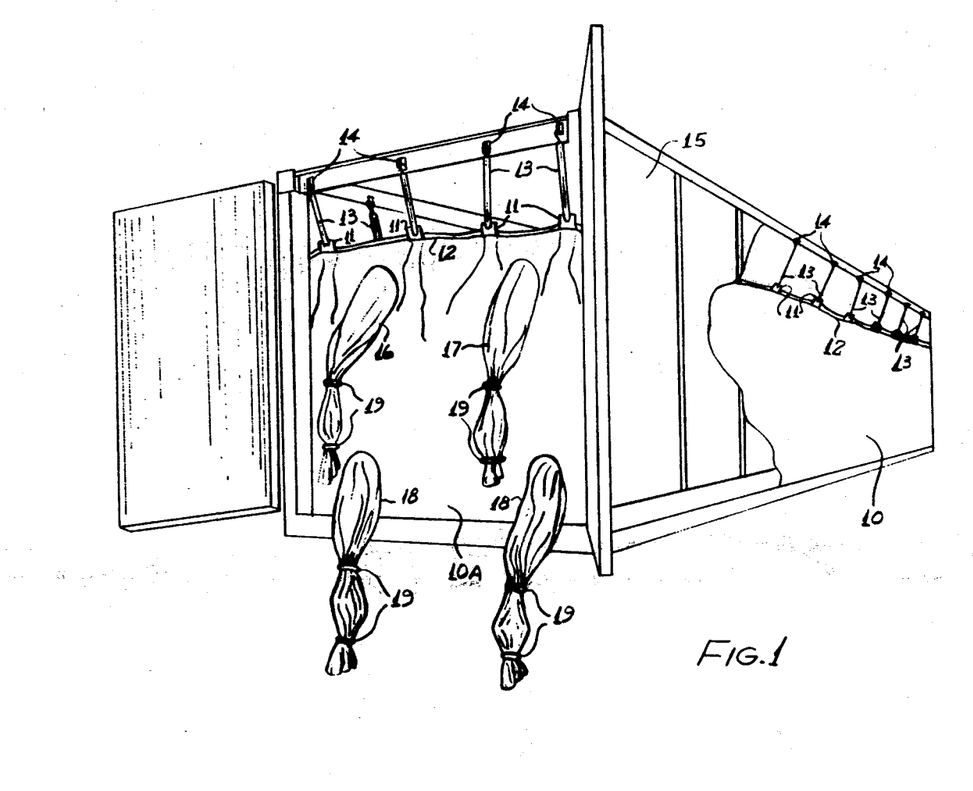
FIG. 1 is a perspective view, partially cut away, showing a three-quarter height flexible liner in a shipping vehicle.

Referring now to the drawings, a flexible liner 10 shown in FIG. 1 may be constructed from a film of a polyolefin, polyester, nylon or p.v.c. The film may be cross laminated, or reinforced with a fibre of nonwoven backing. Alternatively the liner may be made from a vinyl coated fabric or rubberized reinforced fabrics. A preferred liner is constructed from a material commercially available as "Fabrene", which is a woven structure made from tapes of an oriented polyolefin with a polyolefin film backing. (Fabrene is a registered trade mark of Du Pont of Canada.) The flexible liner is preferably made to form a cuboid and has four vertical sides to fit a closed shipping vehicle which in this instance includes a container, van, road truck body or rail box car. The closed shipping vehicle has four verticle walls, one of which defines a door opening. A preferred method of construction when using the Fabrene material is for sewn seams. Alternately heat sealing or adhesive bonding of seams may be utilized. The liner shown in FIG. 1 is a three quarter height liner and has tabs 11 attached to the top seam 12 of the liner 10. The tabs 11 are strategically spaced around the top seam 12 to suit hanging points in the container. One end of a stretchable connector 13 is attached to the tab 11 and the other end of the stretchable connector is attached to a hook 14. The liner 10 in FIG. 1 is shown in a shipping vehicle or container 15. The container 15 shown in FIG. 1 is standard and meets international specifications on containers. Although not shown on the drawings, the standard container generally has a series of reinforcing vertical members inside spaced along the walls of the container 15. These members generally extend to within one-half inch of the top of the container and thus leave a space for inserting the hooks 14 attached to the stretchable connectors 13. It has been found that it is preferable to have a stretchable connector 13 and a hook 14 at each location along the walls of the container where there is a vertical batten. Some containers have a horizontal bar, in certain cases supported by vertical members, extending along the walls located about one-half inch below the top of the container. Other containers have special acceptors strategically placed in the container suitable for the hooks 14. Hereafter reference is made to supporting the stretchable connectors from the top of the walls of the shipping vehicle. It is to be understood that in many instances shipping vehicles have roofs, the top of the walls includes the roof of a shipping vehicle.

Standard containers generally have wooden protection panels extending around the inside walls of the container. These panels may be 2 to 3 ft. high and made of ply wood or in some instances they extend the full height of the container. They act as protection for the vertical battens of the container, protecting them from being damaged during the loading of the container. The panels themselves may be removed and replaced if they become damaged. Furthermore, these panels protect the goods or material being shipped in the container. The sides of the liner 10 are adapted to rest against the walls of the container. The top of the liner 10 as shown in FIG. 1, does not extend to the top of the container but only about three-forths of the way up the walls as illustrated by the position of the top seam 12. One side of the liner is adapted to rest against the front wall of the container 15 and preferably has a means provided such as a stapling strip to attach the liner 10 to the floor and/or the ply wood protective panel at the front wall of the container. The opening side 10A of the liner 10 is arranged for the loading and unloading of the bulk material. The upper portion of the opening side 10A has two apertures, an entry opening 16 and a vent opening 17 in the two upper corners. The lower portion of the opening side 10A has at least one aperture, a discharge opening 18 and preferably two discharge openings 18 as shown in FIG. 1 in the two lower corners. It will be appreciated that a single aperture may extend across the lower portion of the opening side 10A e.g. a rectangular shaped opening which would encompass both the discharge openings 18 as shown in FIG. 1. These apertures are preferably attached to tubular sleeves, which are all similar in design and are preferably round sleeves of plastic material attached to the aperture in the liner 10. In the case of Fabrene liners, the sleeves are attached to the opening side 10A by sewing. In some instances one discharge sleeve 18 may be positioned at the centre of the opening side 10A along the bottom edge, and the sleeve may be rectangular, square or oval in shape to mate with a particular hopper or other removal or take-away device.

Each sleeve has two tie-offs 19. These tie-offs are made from cord or tape preferably attached to the sleeve and may be wrapped around to seal the sleeve and prevent the product escaping or prevent air getting into the liner 10. FIG. 1 shows two tie-offs 19 used per sleeve. One tie-off 19 is sufficient to close the sleeve, but two tie-offs 19 are preferred merely as a matter of safety. If the cord or tape on one tie-off should break, then the second tie-off is sufficient to hold the material in the liner 10.

Figure 2:
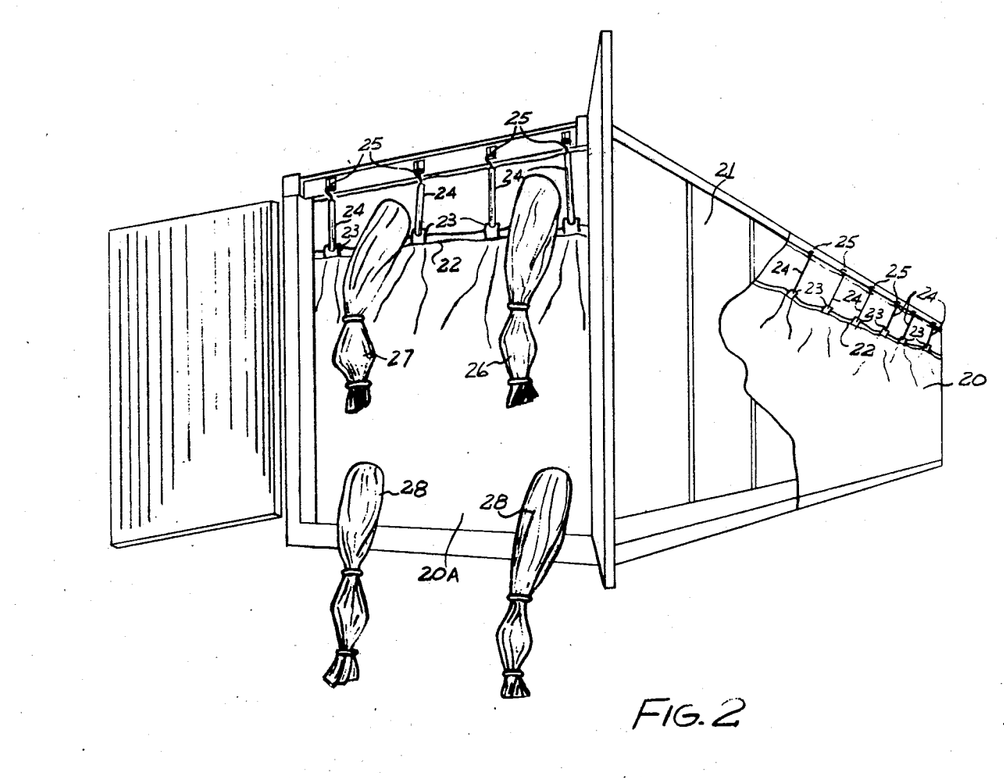
FIG. 2 is a perspective view, partially cut away, showing a full height flexible liner in a shipping vehicle.

In FIG. 2 the liner 20 is a full height liner, the top of the liner 20 extending to the top of the shipping vehicle or container 21. A seam 22 is positioned at approximately three-fourths height of the sides of the liner 20 and has tabs 23 strategically spaced along the seam 22. Each tab 23 is attached to one end of a stretchable connector 24 which has the other end connected to a hook 25. The vent sleeve 26 and the loading sleeve 27 are positioned at the opening side 20A of the liner 20, above the seam 22. This enables the bulk material to be loaded to the maximum height of the liner 20. Two discharge sleeves 28 are shown in the same position at the opening side 20A of the liner 20 as that of FIG. 1.

Figure 3:
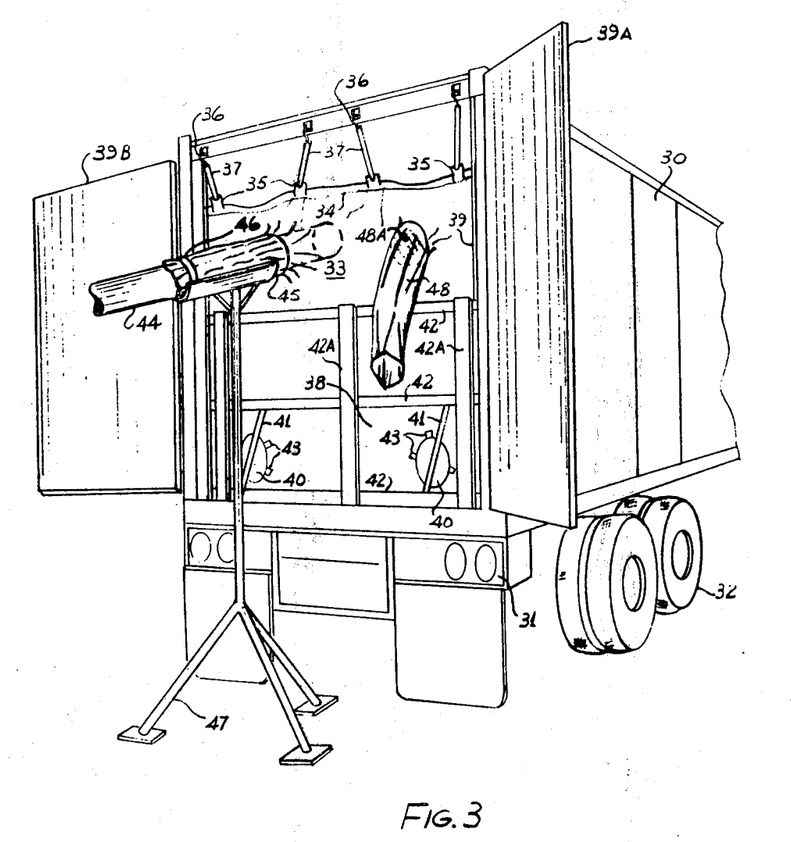
FIG. 3 is a perspective view of a portion of a container during the loading operation and having a flexible liner installed therein, the container supported on a road trailer.

A container 30 is shown in FIG. 3 mounted on a road trailer 31 with wheels 32. The container has a three-fourths height liner 33, the top seam 34 having tabs 35 spaced around the sides, each tab connected to a hook 36 by means of a stretchable connector 37. The stretchable connectors 37 are preferably elastic cords and the hooks 36 are generally S-shaped hooks with one of the S's closed to hold a loop of the stretchable connector 37. The S-shaped hooks may be substituted by rings, calliper clamps or other types of attachment fixtures to connect with hooks or other types of acceptors in the container. A moveable bulkhead 38 is shown in the doorway 39 of the container 30. The bulkhead 38 extends halfway up the height of the doorway 39 and is preferably made of plywood, compressed fibre board or sheet metal with hardwood cross beams 42 and vertical ties 42A. The standard container usually has either a vertical groove on each side of the doors 39A and 39B inside the container 30 or has a corner post on each side of the doors 39A and 39B which extends out from the doorway to form a vertical shoulder. The bulkhead 38 fits into the grooves or behind the vertical shoulders thus holding a filled liner 33 in the container 30 and not allowing it to bulge outwards when the doors 39A and 39B are open. Two opening panels 40 are located at the lower corners of the bulkhead 38 positioned directly in front of the two discharge sleeves in the liner 33. The opening panels 40 in the bulkhead 38 are preferably of a turret type construction. That is to say the panels are round and have a cross piece 41 attached to the panel 40. The panel 40 rotates in the round opening in the bulkhead 38 so that the cross piece 41 also rotates and locks in grooves provided in the cross beams 42 of the bulkhead 38.

Locating tabs 43 are connected to the discharge sleeves in the liner 33 and extend through the opening for the panel 40. It is preferred to have three such locating tabs 43 per discharge sleeve and to attach each by nailing or stapling to the bulkhead 38. Alternatively the locating tabs 43 may be of sufficient length to allow the tabs to be tied together around the panel 40. Thus the discharge sleeves are always located directly behind the panels 40 of the bulkhead 38 and do not move during loading or shipment. A loading pipe 44 is shown inserted through the loading sleeve 45. A tie-off 46 may be used to hold the loading sleeve 45 to the loading pipe 44. The loading pipe 44 is shown supported by a stand 47. The vent sleeve 48 is open to allow air to escape. The vent sleeve 48 has a screen or mesh 48A at the entrance to the liner 33 to stop bulk material blowing out with the escaping air.

Figure 4:
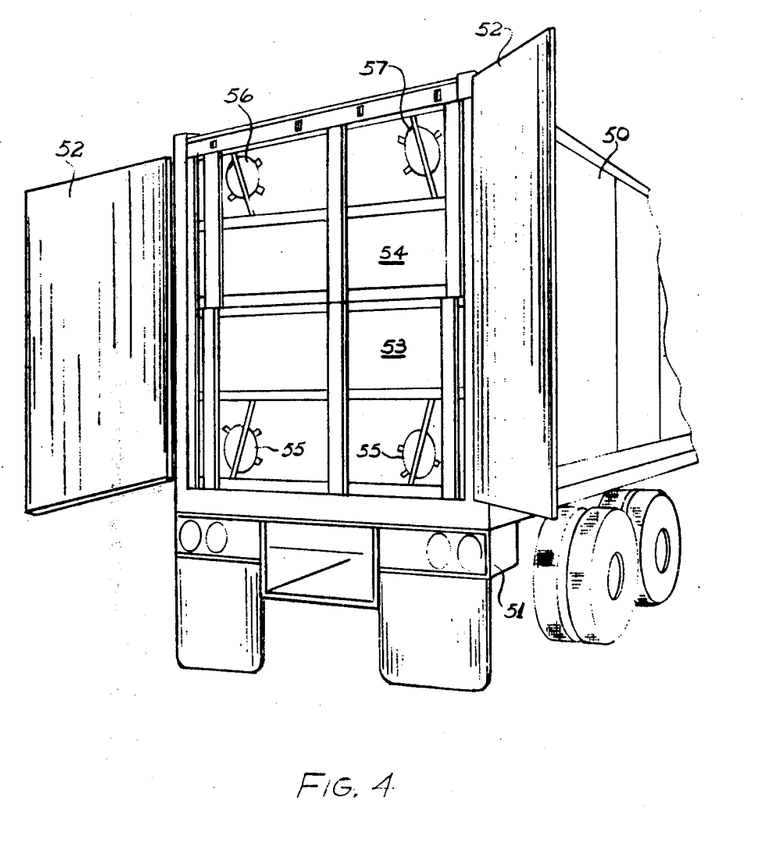
FIG. 4 is a perspective view of a portion of a container showing top and bottom bulkheads in place, the container supported on a road trailer.

A container 50 is shown in FIG. 4 resting on a road trailer 51. The trailer doors 52 are open showing a bottom bulkhead 53 and a top bulkhead 54. The bottom bulkhead 53 has two discharge panels 55 and the top bulkhead 54 has a first opening panel 56 for the loading tube and a second opening panel 57 for the vent sleeve. The design of the bottom panel 53 and top panel 54 are identical, the top panel 54 being an inverted bottom panel 53, and thus having the panel openings at the top. The top panel 54 is only required when a full height liner is installed in the container. Full height liners are required for low density bulk materials.

Figure 5:
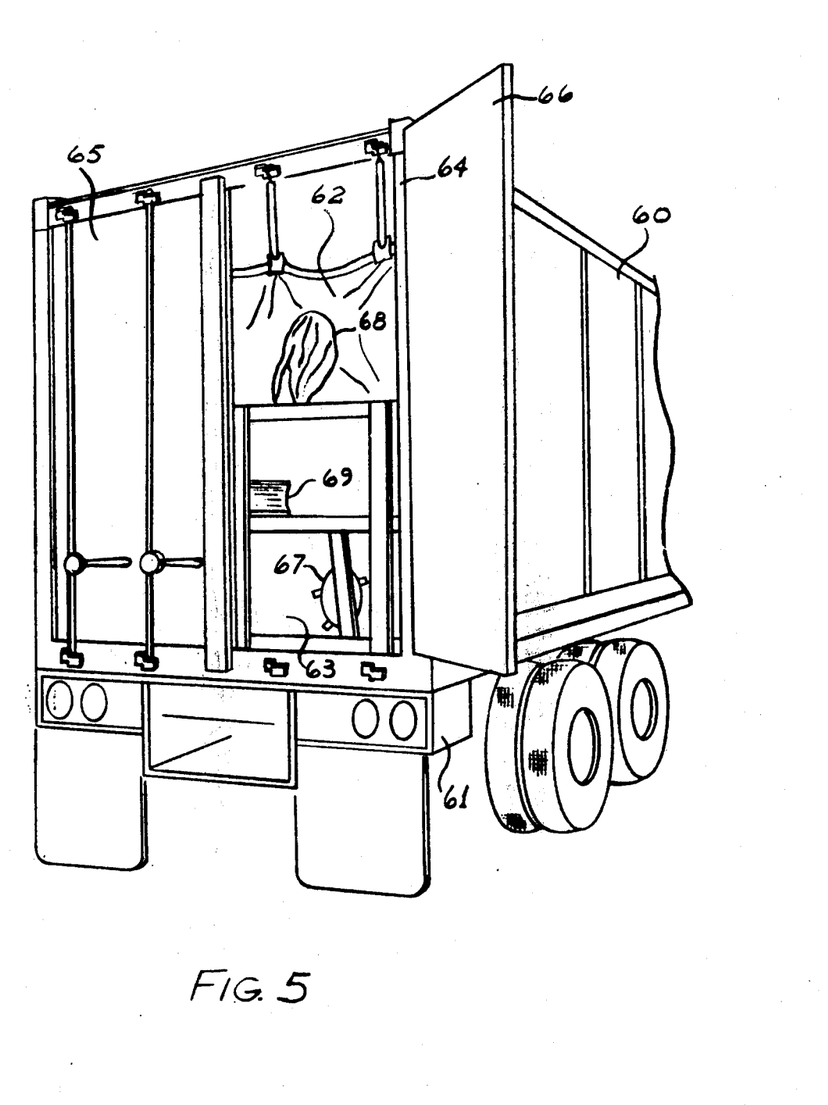
FIG. 5 is a perspective view of a portion of a container with one door closed, showing a three-quarter height flexible liner and a bulkhead, the container supported on a road trailer.

A container 60 shown in FIG. 5 is mounted on a road trailer 61. The container has a three-fourths height liner 62 installed therein with a lower bulkhead 63 positioned in the doorway 64 of the container 60. One door 65 is shown closed and bolted, one door 66 is open to allow access to a discharge panel 67. The vent sleeve 68 is shown with the tie-offs tied and tucked away under the top of the bulkhead 63. A discharge trough 69 is shown in its shipping position on the bulkhead 63. This discharge trough 69 is used in unloading bulk material from the container and otherwise is stored with the lower bulkhead 63 to ensure its availability at all times.

Figure 6:
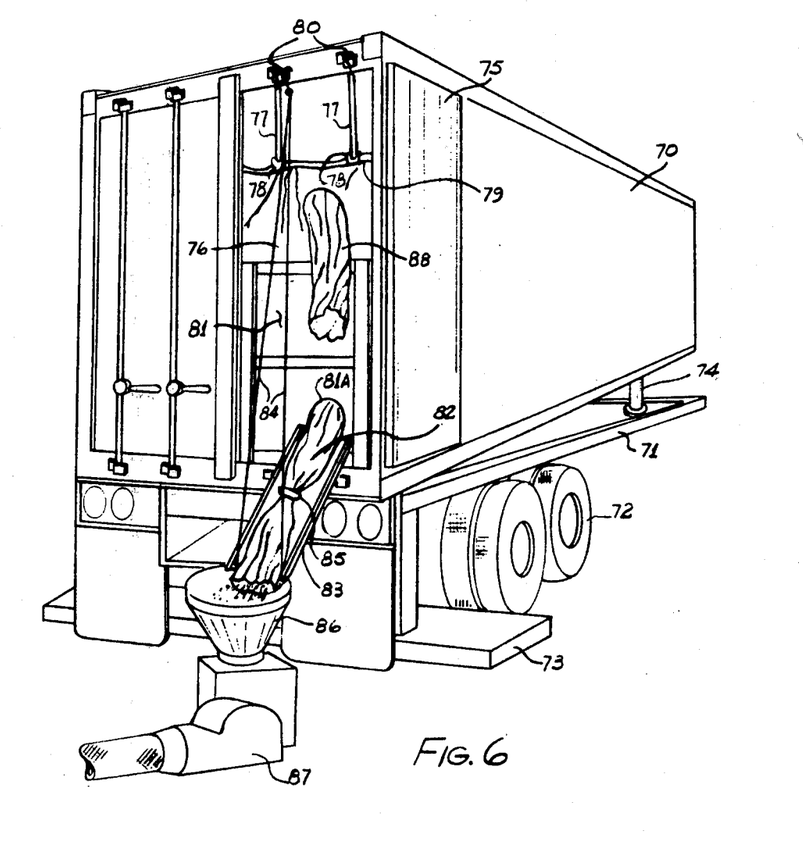
FIG. 6 is a perspective view showing bulk material being discharged from a container having a flexible liner installed therein, the container supported on a road trailer and being tilted at one end to aid in discharging.

FIG. 6 shows a container 70 positioned above a trailer 71. The trailer has wheels 72 and wheel chocks 73 to ensure no movement of the trailer during the unloading operation. A jack 74 is shown under the container 70 resting on the trailer 71. The jack 74 is to assist in unloading the bulk material from the container. In some cases a ramp or side of a hill is found to be sufficient for the unloading step. One door 75 on the container 70 is in the open position and is locked back against the side of the container 70 so that it does not swing when the container 70 is tilted by means of the jack 74. A three-fourths height liner 76 is located in the container and as shown in FIG. 6, this liner 76 is full and is about to be discharged or emptied. Stretchable connectors 77 attached to tabs 78 on the top seam 79 of the liner 76 have hooks 80 attached to the top frame of the container 70. The hooks 80 are attached to the top of the doorway preferably in the slots or fittings used to bolt the door 75 of the container closed. A bulkhead 81 is positioned to hold the lower portion of the liner 76 in place. The discharge panel is removed from the discharge opening 81A in the bulkhead 81 and the discharge tube 82 extends from the discharge opening 81A. The discharge sleeve 82 rests in the discharge trough 83 which is hung on the bulkhead 81 and suspended by cords 84 from the top of the container 70. At least one tie-off 85 surrounds the discharge sleeve 82 acting as a throttling valve to control the flow of bulk material through the discharge sleeve 82. Beneath the end of the discharge sleeve 82 is a hopper 86 connecting to a pneumatic conveying system 87 for conveying the bulk material away. The hopper 86 and pneumatic conveying system do not form part of the present invention. These may be replaced by any removal or take-away device such as a regular hopper and conveying mechanism or the container may be unloaded into a hopper directly above a storage bin.

In the case of a standard container, one man can install a liner made from Fabrene in approximately 10 minutes. It has been found that the liner can be conveniently folded and laid on the bulkhead which is used as a shipping pallet. In the case of a full height liner, two bulkheads are required. Tapes, bands or a cover secure the liner to the bulkhead to form a compact package which may be handled by a fork lift truck. Before the installation of the liner, the container is cleaned. Any jagged edges of the ply wood protection panels are removed or covered over. The installer attaches the front side of the liner 10 to the floor or the wooden protection panel at the front wall of the container. Stapling is preferred as a means of attachment, and a special seam or strip is preferably attached to the front side of the liner 10 specifically for stapling. The line of hooks 14 connected to the stretchable connectors 13 along the front and down one side of the liner 10 are attached to the acceptors along one side wall of the container 15 as shown in FIG. 1. When one side is connected, the line of hooks 14 on the other side of the liner 10 are then attached to the acceptors on the other side wall of the container. The tie-offs 19 are loosened on the vent sleeve 17 to allow air into the liner 10 so that it fills the space inside the container. The bulkhead 53 is placed in the container 50 and fitted into the grooves or behind the vertical shoulders on each side of the doors 52 of the container 50. If necessary, wedges may be provided to jam the bulkhead 53 and prevent it moving in the container. Pressure on the bulkhead 53 is from the inside due to the bulk material in the liner, therefore wedges are not essential. The removable panels 55 are removed and the discharge sleeves 18 as shown in FIG. 1 are pulled through the openings in the bulkhead until the locating tabs 43, as shown in FIG. 3, come through the opening in the bulkhead 38. These locating tabs 43 are then attached, preferably by stapling, to the bulkhead panel 38 or tying around the bulkhead panel 38 thus ensuring that the discharge sleeve does not move behind the bulkhead 38 during shipping. Once these locating tabs 43 are secured, the discharge sleeves are put back into the openings in the bulkhead 38 and the removable panels 40 replaced and locked in place by rotating the cross pieces 41 to fit into grooves provided in the cross beams 42.

In the case of a full height liner being installed in a container, the top bulkhead is installed after the bottom bulkhead has been positioned, carrying out the same procedure as the bottom bulkhead, with the exception of inverting the bulkhead, to attach the locating tabs for the loading sleeve and vent sleeve.

In loading the container, a loading pipe 44 is inserted through the loading sleeve and preferably held by means of the tie-offs 46 as shown in FIG. 3. Loading is preferably carried out pneumatically as this has the added advantage of blowing up the liner to its full size. The vent sleeve 48 is in the open position to allow air to escape and leave the bulk material carried by the pneumatic conveyor in the liner 33. In practice it is found that the bulk material blown into the liner 33 through the loading pipe 44 can be directed to the far end of the liner 33, thus the bulk material is reasonably well distributed throughout the liner 33 as the loading continues. Any unevenness in distribution is cured immediately the container is moved, as vibration caused by road or rail movement tends to make the majority of bulk materials act as fluids and level off throughout the liner 33. The vent sleeve 48 contains a screen or filter 48A at the opening in the liner 33 so that no bulk material is blown out through the vent sleeve 48. Once the liner 33 is full, the loading pipe 44 is removed and the loading sleeve 45 and vent sleeve 48 are tied up with the tie-offs 46 and the loading sleeve 45 is preferably slipped down beneath the bulkhead 38 so that it does not flap about during shipment. Before closing the doors 39A and 39B of the container 30 it is necessary to remove the hooks 36 of the stretchable connectors 37 at the door end of the liner as the hooks 36 hook onto the slot used by the door locks. All the other stretchable connectors 37, however, must remain in position during shipping. It is checked that the discharge trough is secured to the bulkhead for the unloading step, and the doors 39A and 39B are then closed.

The weight capacity of a container depends on the strength of the container, the limiting wheel loads for road transport, crane capacities and rail car capacities. In the case of road transport, this weight is restricted by the limiting wheel loads set by Government authorities. In one example 46,000 lbs. of polyethylene resin were shipped in an 8 × 8 × 40 ft. long container by road transport. The level of the material was less than halfway up the wall of the liner. Thus it was only necessary to have a three-fourths height liner. Lighter density materials may require full height liners.

The method of unloading the container is illustrated in FIG. 6. Once the container has reached its destination some means must be provided to tilt the container. In FIG. 6, a jack 74 is shown between the container 70 and the road trailer 71. One door 75 of the container is first opened, swung back and locked in place so that it will not move when the container 70 is tipped. The vent sleeve 88 is opened by removing the tie-offs thus allowing air to enter the liner to replace the discharging material. The stretchable connectors 77 in the container doorway are connected up to the container 70 by hooks 80 so that the liner 76 retains its shape during the unloading operation. The removable panel is removed and the discharge sleeve 82 is pulled out through the discharge opening 81A in the bulkhead 81. The discharge trough 83 is removed from its storage position in the bulkhead 81, and hung on bulkhead below the discharge opening 81A. Cords 84 support the end of the discharge trough 83 from a convenient place at the top of the container. The hopper 86 of a pneumatic conveying system 87 is positioned beneath the trough 83. The discharge sleeve 82 is laid down the trough 83 and the tie-offs 85 are loosened. The tie-offs are loosened to control the flow of the material through the discharge sleeve 82. Initially when unloading commences, it is unnecessary to tip the container 70. However, as the container 70 empties it is tipped to allow the bulk material to flow down towards the unloading end of the liner 76. When the container 70 is practically empty, the other half door is opened and locked in the open position. The second discharge sleeve is brought out through its discharge opening in the bulkhead 81, and the pneumatic conveying system 87 and the hopper 86 are moved beneath the second discharge sleeve supported by a discharge trough 83, so that all the bulk material is emptied from the container 70. For fast discharge both doors may be opened and both discharge sleeves connected to take-away devices.

Once the bulk material has been emptied from the liner 76 the bulkhead 81 may be removed, the liner 76 unhooked from inside the container 70 and either rolled or folded from the far end so that the air in the liner is allowed to escape through the vent sleeve 88 and discharge sleeves 82, the liner 76 is placed on the bulkhead, strapped down, and either stored or shipped back for further use. It has been found that Fabrene liners are immediately reusable without maintenance between uses. If the liners are damaged they may be repaired and still used again. Similarly the bulkheads are immediately reusable.

Although this specification describes the preferred use of a liner in a container, it will be apparent to those skilled in the art that a similar type liner could be applied to a shipping vehicle having side walls, and opening doors in at least one of the walls, the shipping vehicle could be a box trailer, a van or truck body and in the case of rail transport, a freight car. Other amendments and substitutions may be made to this specification which would be obvious to those skilled in the art, but such amendments do not affect the spirit or scope of the present invention as defined in the following claims.

The embodiments of the invention in which an exclusive property or privilege is claimed are defined as follows:

1. A device for transporting bulk material in a shipping vehicle having walls one of which defines a door opening and doors attached thereto, the device comprising:

a flexible liner having sides adjacent the walls of the shipping vehicle and supported by a plurality of downwardly extending stretchable connectors between the shipping vehicle walls and the liner for flexibly suspending the liner from the top of the walls of the vehicle, the side of the liner adjacent the shipping vehicle door opening having at least two apertures in the upper portion of the liner thereof and at least one aperture in the lower portion of the liner thereof, the apertures in the upper portion of the liner representing an entry opening and a vent opening and the aperture in the lower portion of the liner representing a discharge opening, each of the apertures having a closing means and the apertures being connected to tubular sleeves made from the same material as the liner, the liner being reusable, a separate removable bulkhead positioned in the lower portion of the shipping vehicle door opening, the bulkhead as so positioned being adapted to contain a full liner in the shipping vehicle and not allow it to bulge outwards when the doors are open, the bulkhead having at least one opening and a removable panel therein located adjacent the aperture in the lower portion of the liner, the opening adapted to receive the tubular sleeve connected to the aperture in the lower portion of the liner, the bulkhead being reusable, and the liner being detachably connected to the bulkhead during shipment.

2. The device according to claim 1 including a second separate removable bulkhead positioned in the upper portion of the shipping vehicle door opening, the second bulkhead being substantially identical in shape to the first bulkhead and having two openings and removable panels therein located adjacent the apertures in the upper portion of the liner, the openings adapted to receive the tubular sleeves connected to the apertures in the upper portion of the liner.

3. The device according to claim 2 wherein the closing means for the apertures includes at least one tie-off strip attached to the tubular sleeves.

4. The device according to claim 2 including a loading trough and support cords stored on the bulkhead positioned in the lower portion of the shipping vehicle door opening, the loading trough together with the support cords adapted to support the discharge sleeve during the discharge operation.

5. The device according to claim 1 wherein the closing means for the apertures includes at least one tie-off strip attached to the tubular sleeves.

6. The device according to claim 1 wherein the liner is contructed of a woven polyolefin material having a film layer attached thereto.

7. The device according to claim 1 including a loading trough and support cords stored on the bulkhead positioned in the lower portion of the shipping vehicle door opening, the loading trough together with the support cords adapted to support the discharge sleeve during the discharge operation.

8. The device according to claim 1 wherein the stretchable connectors are flexible cords, one end being attached to the liner at positions strategically spaced apart approximately three-fourths of the height of the walls of the vehicle, the other end of the cords having attachment means thereon.

9. The device according to claim 1 wherein the liner is in the shape of a cuboid, constructed from woven material made from tapes of oriented polyolefin with a polyolefin film backing, and fits into a standard international container, the height of the liner sides being approximately three-fourths the height of the walls of the container, a seam extending around the top of the liner walls having tabs strategically spaced thereon, the tabs each having stretchable connectors in the form of elastic cords with attachment means on the ends thereof.

10. The device according to claim 1 wherein the stretchable connectors are connected at least along the front and down both sides of the liner during shipping.

11. The device according to claim 1 wherein the sides of the flexible liner rest against the walls of the shipping vehicle.

12. The device according to claim 1 wherein the tubular sleeve connected to the aperture in the lower portion of the liner is detachably connected to the bulkhead and is located directly behind the panel during shipment.

13. The device according to claim 1 wherein the tubular sleeve connected to the aperture in the lower portion of the liner is detachably connected to the bulkhead by means of locating tabs connected thereto and extending through the opening in the bulkhead whereby such sleeve is always located directly behind the panel and does not move during shipment.

14. The device according to claim 1 including a cross-piece attached to the panel, such panel being rotatable in the opening in the bulkhead whereby the cross-piece also rotates and such device having means, in the form of grooves, provided in the bulkhead for locking the cross-piece to the bulkhead.

15. The device according to claim 1 including grooves on each side of the doors inside the shipping vehicle and wherein the bulkhead fits into these grooves.

16. The device according to claim 1 including vertical shoulders extending out from the door and wherein the bulkhead fits behind these shoulders.

17. A device for transporting bulk material in a shipping vehicle having walls one of which defines a door opening and doors attached thereto, the device comprising:

a flexible liner having sides adjacent the walls of the shipping vehicle and supported by a plurality of downwardly extending stretchable connectors between the shipping vehicle walls and the liner for flexibly suspending the liner from the top of the walls of the vehicle, the side of the liner adjacent the shipping vehicle door opening having at least two apertures in the upper portion of the liner thereof and at least one aperture in the lower portion of the liner thereof, the apertures in the upper portion of the liner representing an entry opening and a vent opening and the aperture in the lower portion of the liner representing a discharge opening, each of the apertures having a closing means and the apertures being connected to tubular sleeves made from the same material as the liner, a removable bulkhead detachably connected to the liner positioned in the lower portion of the shipping vehicle door opening, the bulkhead adapted to contain a full liner in the shipping vehicle, the bulkhead having at least one opening and a removable panel therein located adjacent the aperture in the lower portion of the liner, the opening adapted to receive the tubular sleeve connected to the aperture in the lower portion of the liner, and a loading trough and support cords stored on the bulkhead positioned in the lower portion of the shipping vehicle door opening, the loading trough together with the support cords adapted to support the discharge sleeve during the discharge operation.

18. A device for transporting bulk material in a shipping vehicle having walls one of which defines a door opening and doors attached thereto, the device comprising:

a flexible liner having sides adjacent the walls of the shipping vehicle and supported by a plurality of downwardly extending stretchable connectors between the shipping vehicle walls and the liner for flexibly suspending the liner from the top of the walls of the vehicle, the side of the liner adjacent the shipping vehicle door opening having at least two apertures in the upper portion of the liner thereof and at least one aperture in the lower portion of the liner thereof, the apertures in the upper portion of the liner representing an entry opening and a vent opening and the aperture in the lower portion of the liner representing a discharge opening, each of the apertures having a closing means and the apertures being connected to tubular sleeves made from the same material as the liner, a removable bulkhead detachably connected to the liner positioned in the lower portion of the shipping vehicle door opening, the bulkhead adapted to contain a full liner in the shipping vehicle, the bulkhead having at least one opening and a removable panel therein located adjacent the aperture in the lower portion of the liner, the opening adapted to receive the tubular sleeve connected to the aperture in the lower portion of the liner, a second removable bulkhead positioned in the upper portion of the shipping vehicle door opening, the second bulkhead being substantially identical in shape to the first bulkhead and having two openings and removable panels therein located adjacent the apertures in the upper portion of the liner, the openings adapted to receive the tubular sleeves connected to the apertures in the upper portion of the liner and a loading trough and support cords stored on the bulkhead positioned in the lower portion of the shipping vehicle door opening, the loading trough together with the support cords adapted to support the discharge sleeve during the discharge operation.

19. A receptacle for bulk material comprising:

a container having a top, a bottom, and four vertical walls, one of which has means for providing an opening into the container, a flexible liner for containing the bulk material connected to the container and having a top, a bottom, and sides adjacent the walls of the container, the liner being supported by a plurality of downwardly extending stretchable connectors between the container walls and the liner for flexibly suspending the liner from the top of the walls of the container, the side of the liner adjacent the container wall having the means for providing the opening into the container having at least two apertures in the upper portion thereof and at least one aperture in the lower portion thereof, the apertures in the upper portion of the liner defining an entry opening and a vent opening and the aperture is the lower portion of the liner defining a discharge opening, each of the apertures in the liner being connected to tubular sleeves and having a closing means, the liner being reusable, and a separate removable bulkhead detachably connected to the liner and being fitted into position in the container between the side of the liner having the apertures and the container wall having the means for providing an opening into the container, the bulkhead being adapted to hold a full liner in the container and not allow it to bulge outwards when the container is opened, the bulkhead having at least one opening and a removable panel therein located adjacent the aperture in the lower portion of the liner, the tubular sleeve connected to the aperture in the lower portion of the liner being located directly behind the panel and the opening being adapted to receive this sleeve, and the bulkhead being reusable.

20. The receptacle of claim 19 wherein the tubular sleeve connected to the aperture in the lower portion of the liner is connected to the bulkhead by means of locating tabs connected thereto and extending through the opening in the bulkhead whereby such sleeve is always located directly behind the panel and does not move during shipment.

21. A method of transporting bulk material in a shipping vehicle having walls, one of which defines a door opening and doors attached thereto, including the steps of:

flexibly suspending a flexible liner inside the vehicle and from the top of the walls thereof, the flexible liner having sides resting adjacent the walls and having a loading sleeve, a vent sleeve and at least one unloading sleeve connected to apertures in the side of the liner adjacent the door opening, installing a separate bulkhead in the door opening in the vehicle, the bulkhead having at least one removable panel for the unloading sleeve, loading bulk material through the loading sleeve into the flexible liner by pneumatic loading means, and closing the apertures whereby to complete the loading operation.

22. The method of claim 21 including:

unloading of the bulk material while controlling such unloading by tie-off means attached to the unloading sleeve.

23. The method of claim 21, further including the steps of:

fitting the bulkhead in position between the liner and the wall defining the door opening and detachably connecting the liner to the bulkhead by moving the unloading sleeve through the opening defined by the removable panel and connecting it to the outside of the bulkhead, after which the removable panel is replaced.

* * * * *